A. C. VAN HOUWELING.
LATERAL CONVEYER FOR THRESHING MACHINE FEEDERS.
APPLICATION FILED JULY 21, 1909.
1,082,716.
Patented Dec. 30, 1913.
3 SHEETS—SHEET 3.
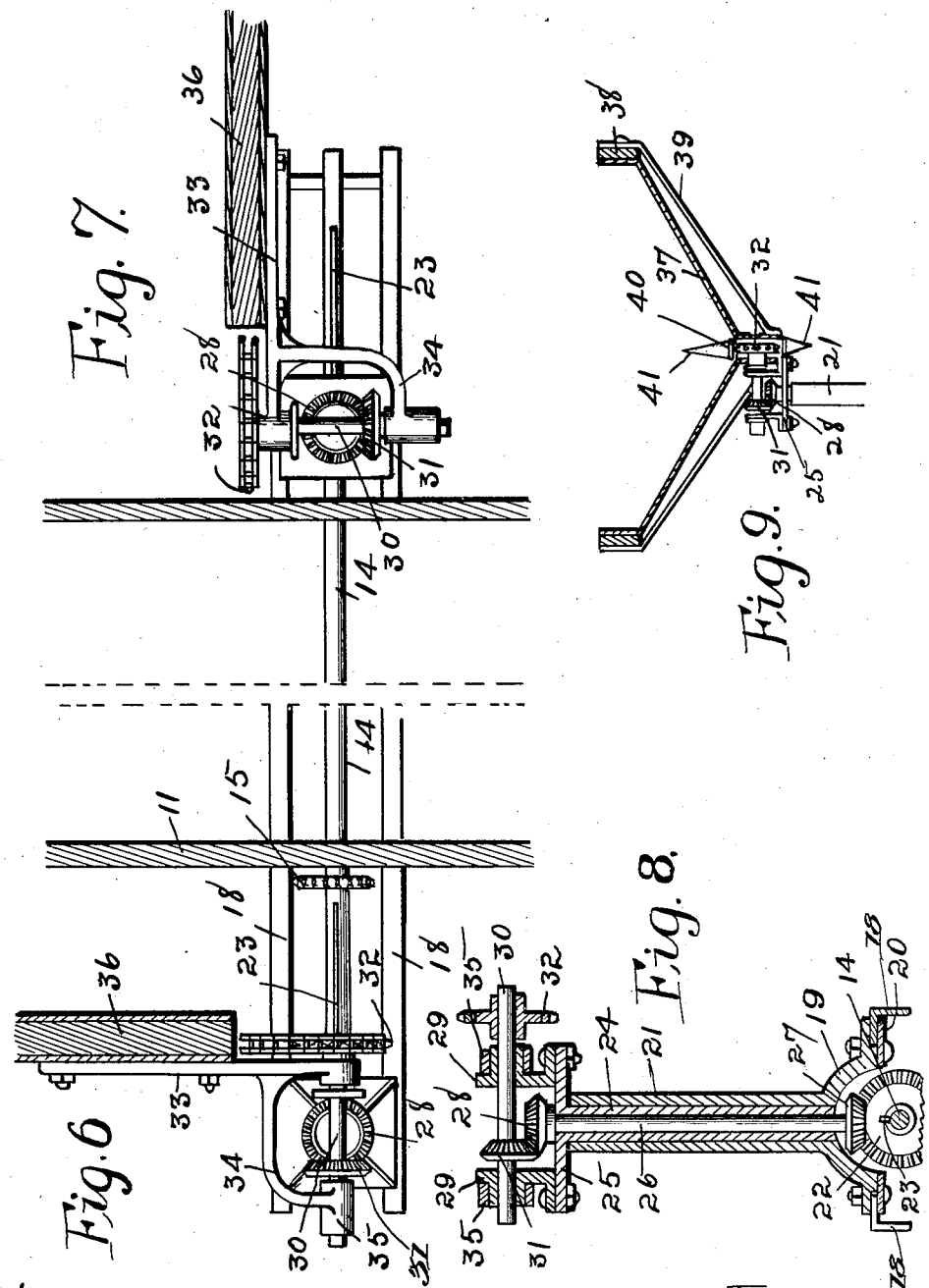

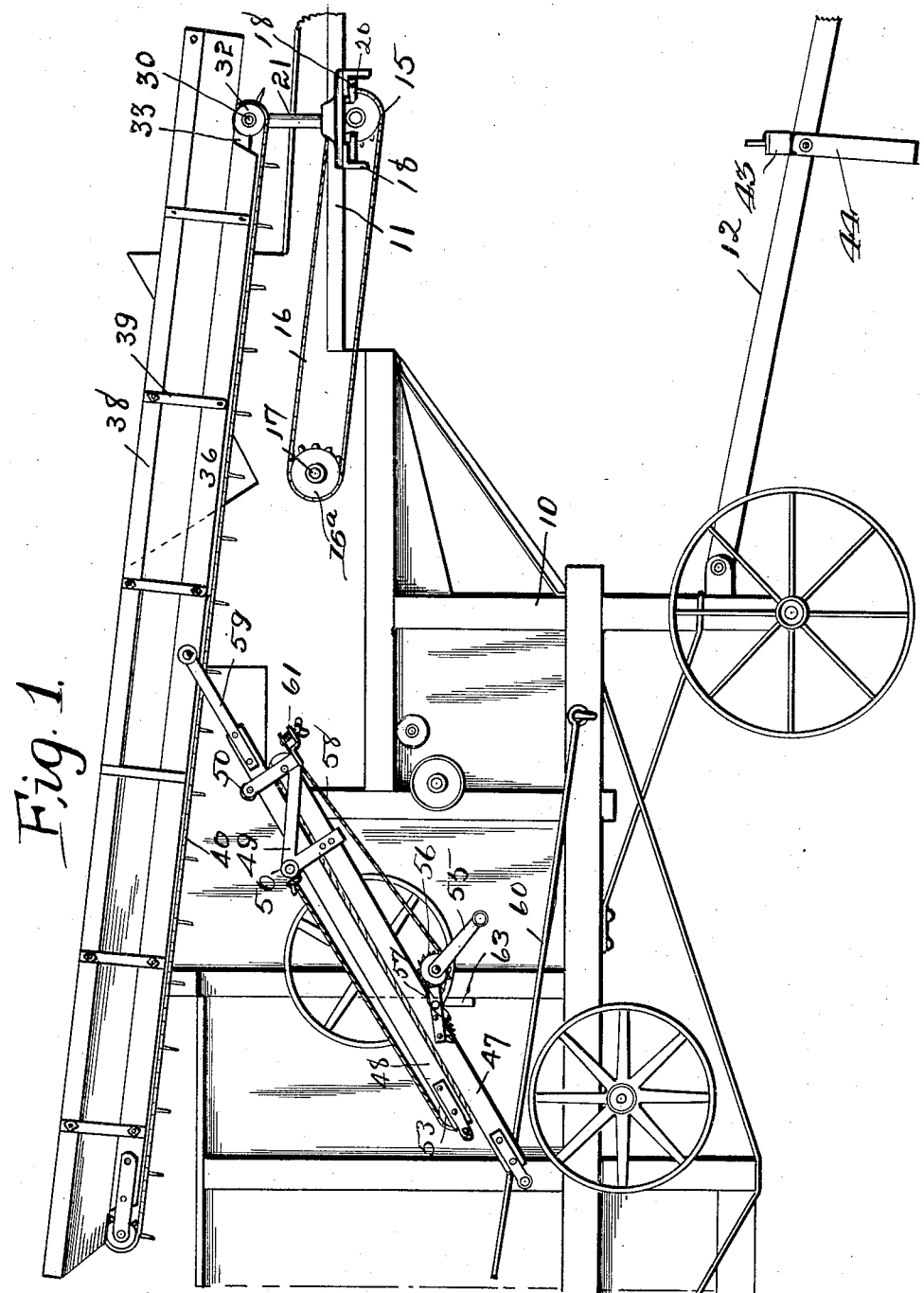

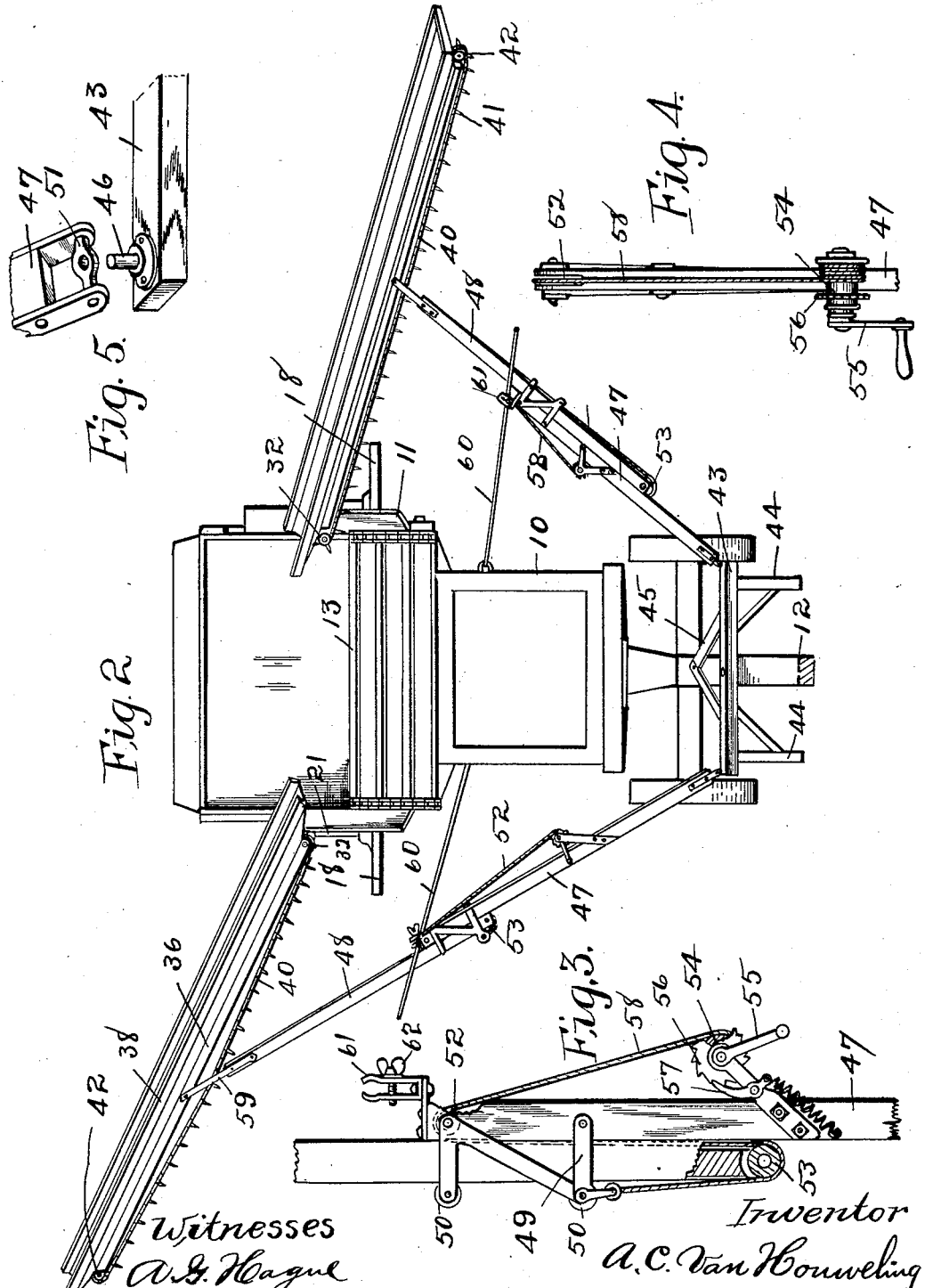

UNITED STATES PATENT OFFICE.

ARTHUR C. VAN HOUWELING, OF PELLA, IOWA.

LATERAL CONVEYER FOR THRESHING-MACHINE FEEDERS.

1,082,716. Specification of Letters Patent. Patented Dec. 30, 1913.

Application filed July 21, 1909. Serial No. 508,857.

*To all whom it may concern:*

Be it known that I, ARTHUR C. VAN HOUWELING, a citizen of the United States, residing at Pella, in the county of Marion and State of Iowa, have invented a certain new and useful Lateral Conveyer for Threshing-Machine Feeders, of which the following is a specification.

The objects of my invention are to provide a lateral conveyer of simple, durable, and inexpensive construction, especially designed to be applied to a threshing machine feeder for the purpose of receiving bundles of grain that are arranged in position alongside of the threshing machine and to carry said bundles of grain to the feeder.

More specifically, it is my object to provide a lateral conveyer of this class that may be driven by power from the feeder in unison with the feeder conveyer, and that may freely swing in both horizontal and vertical planes, and the end of the lateral conveyer adjacent to the feeder may be moved outwardly away from the feeder to permit it to be folded in position alongside of the threshing machine so that it may be readily carried and stored.

A further object is to provide improved means for vertically adjusting the lateral conveyer and for holding said adjusting means in a folded position alongside of the threshing machine.

A further object is to provide improved means for supporting the lateral conveyer against horizontal movement when in position for use.

A further object is to provide a lateral conveyer trough of simple, durable and inexpensive construction.

My invention consists in the construction, arrangement, and combination of the various parts of the device, whereby the objects contemplated are attained, as hereinafter more fully set forth, pointed out in my claims, and illustrated in the accompanying drawings, in which—

Figure 1 shows a side elevation of a part of a threshing machine and feeder having my improved lateral conveyer applied thereto and in a folded position. Fig. 2 shows a front end elevation of a threshing machine feeder having two of my improved lateral conveyers applied thereto, shown in extended positions for use. Fig. 3 shows an enlarged, detail side view illustrating one of the adjustable supporting legs for the lateral conveyers. Fig. 4 shows an edge view of one of the adjustable legs for the lateral conveyers, the clamping bracket and the upper end of the upper section being omitted. Fig. 5 shows an enlarged, detail, perspective view illustrating the means for detachably connecting the adjustable supporting leg with the cross piece on the threshing machine tongue. Fig. 6 shows an enlarged, detail, horizontal, sectional view illustrating the means for slidingly supporting the inner end of the lateral conveyer frame, the lateral conveyer in said figure being shown parallel to the feeder frame. Fig. 7 shows a similar view with the lateral conveyer at right-angles to the feeder frame. Fig. 8 shows an enlarged, detail, vertical, sectional view illustrating the support for the inner end of the lateral conveyer, and Fig. 9 shows a detail, transverse, sectional view of the lateral conveyer frame and the chain driving device therefor.

Referring to the accompanying drawings, I have used the reference numeral 10 to indicate that portion of the threshing machine shown, and 11, the feeder frame attached thereto. The threshing machine is provided with a tongue 12 of the ordinary kind. Mounted within the feeder frame is a conveyer 13 of ordinary construction. Mounted in the feeder frame is a transverse shaft 14 having a sprocket wheel 15 fixed thereon and connected by a sprocket chain 16. This chain is connected to a sprocket wheel 16$^a$ mounted on a shaft 17 driven by a feeder so that the said shaft 14 will be driven in unison with the conveyer of the feeder.

Mounted beneath the feeder frame on opposite sides of the shaft 14 are two angle bars 18 projected beyond the sides of the feeder frame. Slidingly mounted upon these angle bars 18 is a base 19 having plates 20 beneath it, said base resting on top of the angle bars and said plates projecting under the angle bars to form a sliding connection between the base and the angle bars. Formed on the upper portion of the base 19 is a tubular standard 21. Slidingly mounted upon the shaft 14 is a beveled pinion 22, and said shaft is provided with a spline 23 extended through the beveled pinion 22, whereby said pinion is slidingly and non-rotatably mounted upon the shaft. The said base 19 is designed to engage the beveled pinion 22 in such a manner as to move it longitudinally of the shaft 14 when the said base is so moved. Slidingly mounted within the tubular standard 21 is a tubular bearing 24 having a plate 25 at its top, and within this tubular bearing is a shaft 26 rotatably mounted and provided with a beveled pinion 27 on its lower end and a beveled pinion 28 on its upper end, the former being in mesh with the beveled pinion 22. On top of the plate 25 are the bearings 29 to support a horizontal shaft 30. This shaft is provided with a beveled pinion 31 in mesh with the pinion 28 and also with a sprocket wheel 32 at one side of the bearings.

The frame of the lateral conveyer is connected with a bracket 33, which bracket has a forked extension 34, and said extension has bearings 35 thereon pivotally supported on the bearings 29 so that said bracket is capable of free swinging movement in a vertical plane. It is obvious that the said bracket 33 may also freely swing in a horizontal plane on account of the tubular bearing 24 resting in the tubular standard 21, and that the shaft 30 will be driven from the shaft 14 when the lateral conveyer frame is in any position of its adjustment.

The lateral conveyer frame proper comprises a central longitudinal support 36 and two sheet metal side pieces 37 secured to the sides of the central support and extended upwardly and outwardly and reinforced at their outer ends by means of the longitudinal supports 38. A number of braces 39 are connected to the parts 38 and are extended downwardly and inwardly and attached to the lower portions of the central support 36 to firmly hold said sheet metal sides 37 in position. A sprocket chain 40 having fingers 41 thereon, is passed over the sprocket wheel 32 and moves in one direction over the central support 36 and in the other direction under it, and at the outer end of the lateral conveyer is an idler sprocket wheel 42 over which said chain travels. By the construction just described, it is obvious that the sprocket chain of the lateral conveyer will be driven, no matter in what position the lateral conveyer may be with relation to the feeder frame, and that the base 19 may move laterally a limited distance relative to the feeder frame without affecting the operation of the chain of the lateral conveyer.

The means for supporting the lateral conveyer frame comprises the following devices: Mounted upon the tongue 12 is a cross piece 43 having supporting legs 44 to rest upon the ground, and braces 45 to connect it with the tongue. On each end of the cross piece 43 is an upright pin 46, shown in Fig. 5. Each conveyer frame is provided with an adjustable supporting leg. This supporting leg comprises a lower member 47 and an upper member 48 slidingly connected with each other by means of the bracket 49 and rollers 50. At the lower end of the member 47 is a cross piece 51 having an opening therein to receive the pin 46. This cross piece is pivoted in the member 47 so that the said member 47 has a universal movement with relation to the cross piece 43. At the top of the member 47 is a pulley 52 and at the bottom of the member 48 is a pulley 53. Mounted upon the member 47 is a windlass 54 operated by a hand-crank 55 and also provided with a ratchet wheel 56 engaged by a spring-actuated pawl 57. Fixed to and wound upon the windlass 54 is a rope or cable 58 passed over the pulley 52 and then under the pulley 53 and attached to the bracket 49 which is connected with the member 47, as clearly shown in Fig. 3. The upper end of the member 48 is pivotally connected with the lateral conveyer frame by means of the arms 59. By this arrangement, it is obvious that the crank 55, when turned in one direction, will result in extending the adjustable leg by sliding the two members 47 and 48 relative to each other, and the pawl 57 will hold them against downward movement in any position of adjustment in which they may be placed. When it is desired to have the supporting leg members move toward each other to lower the lateral conveyer frame, the pawl 57 is released from the ratchet wheel and the crank 55 may then be turned in the opposite direction, and the weight of the conveyer frame will cause the extensible leg to be folded to permit the lateral conveyer frame to swing downwardly. I have also provided means for holding the lateral conveyer frame against swinging movements in a horizontal plane so that said frames will not be affected by the wind. Pivotally connected with the threshing machine body is a rod 60, and mounted on the upper end of the adjustable leg member 47 is a clamp 61 designed to receive the rod 60 and provided with a clamping screw 62. In Fig. 2 of the drawings, the function of these rods and clamping devices is clearly illustrated, and it is readily seen how they prevent horizontal swinging movements of the lateral conveyer frames.

In practical use and assuming that the lateral conveyer frames are in the positions shown in Fig. 2, it is obvious that the weight of the frames is firmly supported upon the cross piece 43 and that said frames are held against vertical movement by the adjustable legs and against horizontal swinging movements by the rods and clamping devices. Assuming that it is desired to change the position of either of the lateral conveyers, the operator simply releases the clamping screw 62, and he may then freely swing the lateral conveyer frame laterally to the desired position, whereupon the clamping screw may be tightened. If it is desired to change the elevation of the lateral conveyer, this may be done by a manipulation of the crank 55 as before described.

Assuming that it is desired to fold the lateral conveyer frames against the sides of the threshing machine, the operator first bodily moves said frames in such a manner as to slide the supports at the inner ends of the frames to the outer ends of the angle bars 18; then the lateral conveyer frames may be folded to positions parallel with the sides of the threshing machine frame and they will stand spaced apart from the sides of the frame so that they will not interfere with the various pulleys, belts, etc., which are usually found on the sides of threshing machines. Then the adjustable legs may be moved to the position shown in Fig. 1 and supported upon a projecting bracket 63 at the side of the threshing machine. By this arrangement, it is obvious that the lateral conveyer frames may be readily, quickly and easily swung from their folded positions to their positions ready for use by simply sliding the inner ends of the lateral frames inwardly on the angle bars 18, and without removing any bolts, nuts or other fastening devices.

I claim as my invention.

1. The combination with a support, of a rotatable shaft projected laterally from the support, a track extended laterally from the support adjacent to said shaft, a bracket slidingly mounted upon said track, a lateral conveyer frame, a conveyer therein, said frame being mounted on said bracket and capable of movement toward and from the support, and a gearing device interposed between said shaft and the conveyer in the lateral conveyer frame, for the purposes stated.

2. The combination of a support, a rotatable shaft extended laterally from the support, two bars fixed to the support and extended laterally on opposite sides of the shaft, a base slidingly mounted on said bars, an upright shaft mounted in said base, a gearing device for connecting the upright shaft with the lateral shaft, said gearing device being capable of longitudinal movement on the lateral shaft, a lateral conveyer frame pivotally supported at the upper end of said upright shaft, a conveyer and a lateral conveyer frame, and a gearing device interposed between the upright and said conveyer for driving the latter.

3. In a device of the class described, the combination of a support, a rotatable shaft extended laterally from it, two angle bars extended laterally from the support on opposite sides of said shaft, a base slidingly mounted on said angle bars and having a vertically arranged sleeve thereon, a tube rotatably mounted within the sleeve, brackets fixed on top of said tube, a horizontal shaft in said brackets, a beveled gear wheel slidingly and non-rotatably mounted on the first mentioned shaft, a vertical shaft mounted in said upright tube, a beveled gear wheel at each end of the vertical shaft, the lower one being in mesh with the beveled gear wheel on the lateral shaft, a beveled gear wheel on the upper horizontal shaft in mesh with the upper gear wheel on the vertical shaft, a lateral conveyer frame pivotally connected to said brackets, a conveyer therein, and means for driving the conveyer from the upper horizontal shaft.

4. In a device of the class described, the combination of a support, a rotatable shaft extended laterally from it, two angle bars extended laterally from the support on opposite sides of said shaft, a base slidingly mounted on said angle bars and having a vertically arranged sleeve thereon, a tube rotatably mounted within the sleeve, brackets fixed on top of said tube, a horizontal shaft in said brackets, a beveled gear wheel slidingly and non-rotatably mounted on the first mentioned shaft, a vertical shaft mounted in said upright tube, a beveled gear wheel at each end of the vertical shaft, the lower one being in mesh with the beveled gear wheel on the lateral shaft, a beveled gear wheel on the upper horizontal shaft in mesh with the upper gear wheel on the vertical shaft, a lateral conveyer frame pivotally connected to said brackets, a conveyer therein, and means for driving the conveyer from the upper horizontal shaft, said means comprising a sprocket wheel fixed to the upper horizontal shaft and having the conveyer in the lateral conveyer frame passed around it.

5. In a device of the class described, a lateral conveyer frame, comprising a solid longitudinally arranged support, two sheet metal sides overlapping the sides of said support and extended outwardly and upwardly in opposite directions, and a bracket resting against one of the sheet metal sides and secured to the said support, said bracket having two bearings thereon, an arm secured to said conveyer frame, journals on said arm mounted on said bearings to permit said arm to move in a vertical plane and means for mounting said bracket to permit it to move in a horizontal plane.

6. In a device of the class described, a lateral conveyer frame, comprising a solid longitudinally arranged support, two sheet metal sides overlapping the sides of said support and extended outwardly and upwardly in opposite directions, a bracket resting against one of the sheet metal sides and secured to the said support, said bracket having two bearings thereon and journals upon which said bearings are mounted, a horizontally arranged shaft extended through said journals, a sprocket wheel thereon, a sprocket wheel at the opposite end of the lateral conveyer frame, and a sprocket chain passed around said sprocket wheel and also arranged below said central support to move in a vertical plane, and means for mounting said bracket to permit it to move in a horizontal plane.

7. In a device of the class described, the combination of a support, a cross piece connected therewith having a journal thereon, an adjustable leg having an opening at one end to receive said journal, and a lateral conveyer frame pivoted to the said support and having said adjustable leg pivotally connected with its upper end.

8. In a device of the class described, the combination of a support, a cross piece mounted on the support and having journals on its ends, two adjustable legs, each having at its lower end a swiveled cross piece provided with an opening designed to receive one of said journals, two lateral conveyers pivotally connected to the support and each having one of said adjustable legs pivoted to it, for the purposes stated.

Des Moines, Iowa, June 24, 1909.

ARTHUR C. VAN HOUWELING.

Witnesses:
GEO. J. THOMASSEN,
W. G. VANDER PLOEG.

---

Copies of this patent may be obtained for five cents each, by addressing the "Commissioner of Patents, Washington, D. C."